(12) United States Patent
Ahmann

(10) Patent No.: US 10,965,730 B2
(45) Date of Patent: Mar. 30, 2021

(54) CENTRAL INFOSERVICES PLATFORM

(71) Applicant: Christian Nicolas Ahmann, Zurich (CH)

(72) Inventor: Christian Nicolas Ahmann, Zurich (CH)

( * ) Notice: Subject to any disclaimer, the term of this patent is extended or adjusted under 35 U.S.C. 154(b) by 0 days.

(21) Appl. No.: 16/857,417

(22) Filed: Apr. 24, 2020

(65) Prior Publication Data
US 2020/0252445 A1 Aug. 6, 2020

Related U.S. Application Data

(63) Continuation of application No. 14/633,118, filed on Feb. 26, 2015, now Pat. No. 10,673,923.

(60) Provisional application No. 61/993,547, filed on May 15, 2014, provisional application No. 61/022,755, filed on Jul. 10, 2014.

(51) Int. Cl.
*H04L 29/08* (2006.01)
*G06F 16/958* (2019.01)
*G06F 16/955* (2019.01)
*G06F 16/957* (2019.01)

(52) U.S. Cl.
CPC .......... *H04L 67/02* (2013.01); *G06F 16/958* (2019.01); *G06F 16/9558* (2019.01); *G06F 16/9577* (2019.01); *G06F 16/986* (2019.01); *H04L 67/26* (2013.01)

(58) Field of Classification Search
CPC .................................................. H04L 67/26
See application file for complete search history.

(56) References Cited

U.S. PATENT DOCUMENTS

| | | | |
|---|---|---|---|
| 7,984,056 B1 * | 7/2011 | Kane ................ | G06Q 30/02 707/749 |
| 9,317,612 B1 | 4/2016 | Camplejohn et al. | |
| 10,673,923 B2 | 6/2020 | Ahmann | |
| 2005/0267973 A1 | 12/2005 | Carlson et al. | |
| 2006/0167860 A1 | 7/2006 | Eliashberg et al. | |
| 2007/0094365 A1 | 4/2007 | Nussey et al. | |
| 2008/0147780 A1 | 6/2008 | Trevor et al. | |
| 2009/0049540 A1 * | 2/2009 | Khalil ................ | H04L 67/02 726/14 |
| 2010/0205169 A1 | 8/2010 | Narayan et al. | |
| 2014/0101304 A1 | 4/2014 | Webster | |
| 2014/0258824 A1 | 9/2014 | Khosla et al. | |

* cited by examiner

*Primary Examiner* — Asher D Kells
(74) *Attorney, Agent, or Firm* — Middleton Reutlinger; Eric S. Barr

(57) ABSTRACT

A method which facilitates the offering and subscription to infoservices and sending of information to subscribers based on web feeds is disclosed. In an embodiment of the invention only a link is placed on a website allowing any visitor/readers to subscribe to receive newly published content of that website, without the owner of that website having to take any additional steps to offer this infoservice. Subscribers can choose which messages they want to receive, for example only messages which are linked to certain tags or contain certain keywords, and how they should be delivered, for example by email, mobile, news page or web feed. The central infoservices platform additionally allows publishers of the infoservice's underlying web feed to prove ownership of the infoservice's underlying website or web feed, and providing publishers access to the collected information about subscribers of the infoservice.

17 Claims, 11 Drawing Sheets

Email delivery

Mobile delivery (app)

News page delivery

CENTRAL INFOSERVICES PLATFORM

BACKGROUND

The present invention relates to the field of content publication, and in particular to delivering frequently updated content over a network, and more specifically for enabling subscription services or infoservices based on web feeds in a way which significantly reduces the complexity for both subscribers as well as publishers.

The rise of the internet and the development of publication tools has made it very convenient for publishers to set up websites and provide content to the public in a quick and cost-effective manner. However, most websites are only economically successful if they manage to attract a significant number of readers ("website traffic"), as this determines the value of the website which can be monetized in various ways, e.g. by placing advertising on the website. Website traffic is the result of both new visitors coming to the website, as well as returning readers. As an important tool to build up the number of returning readers publishers choose to offer visitors to subscribe to their website so that subscribers receive alerts when new content has been published, so that those subscribers come back to the website and increase the website traffic accordingly. For example, many publishers offer email-newsletters or social media (Facebook, Twitter etc.) subscription options or infoservices which allow subscribers to get updates once new content has been published.

Another technology to provide a subscription option or infoservice for a website's content are web feeds. Web feeds are separate web pages which mirror a part or the full website's content in a structured format. This structured format allows other software programs to read and further process this information. For example, subscribers can download and use "feed reader software" which screens the content of the selected web feeds and delivers new content to subscribers if such content has been published. Most new websites already have such web feeds included when they are set up, for example a website with the domain www.samplesite.com may have already a web feed at the location www.samplesite.com/feed. Two common forms of web feeds are RSS ("Really Simple Syndication") feeds and Atom feeds.

Despite the advantages, web feed technology has not reached widespread adoption by the internet community. The main reason for this is that web feeds are perceived as very technical and complicated for the average internet user. For example, if a web feed page is opened in a browser, it displays a page of codes which provides no further information how to use it.

As a result of the above, services have been developed which redirect the user, if opened the url of a web feed page, to a more user-friendly webpage which includes an instruction how to subscribe to it. However, replacing the web feed with such an infoservice requires a number of steps for the publishers, such as registering at a third-party-service which provides this feature, which many publishers find too cumbersome to do. Also, many publishers are not aware of those services. Therefore many publishers do not use those services and subscribers face the challenges as mentioned above. Also, the subscription pages where subscribers subscribe to the infoservices typically only have a very limited functionality for subscribers to tailor the messages they are going to receive in the future to their needs, e.g. with respect to message content (no filtering features) as well as with respect to output channels, i.e. subscribers cannot choose how messages will be delivered to them.

Therefore, there is a need for a technology that enables publishers to quickly and easily offer an infoservice to their visitors based on their web feed(s) which provides an easy-to-use interface for subscribers, as well as various features for subscribers to subscribe according to their needs. The present invention solves this and other problems in a unique and novel manner.

SUMMARY

A method enabling website owners to quickly offer a subscription option or infoservice which provides subscribers with various subscription features, is disclosed. In one embodiment, website owners only have to place a link on their website to offer this service, no further steps are required from their side. Subscribers have the option to subscribe in the way they prefer. For example, they can determine the content they want to receive, e.g., they can select to only receive messages which contain certain keywords or are linked to certain tags, or they can select to only receive the title of the messages or the full message. Subscribers may choose how messages will get delivered to them, for example by email, web feed, mobile, or on their personal news website. In another embodiment, publishers can validate that they are the owners of an infoservice's underlying web feed, thereby getting access to data which the central infoservices platform collected about the subscribers of that infoservice.

In accordance with these and other objects, which will become apparent hereinafter, the instant invention will now be described with particular reference to the accompanying drawings.

DETAILED DESCRIPTION

The disclosed embodiments describe examples of a method (and corresponding system and computer program product) for allowing users to subscribe to a websites content based on their interests. As described herein, an infoservice is a subscription service offered by a central infoservices platform and based on a web feed which provides the content. By using the central infoservices platform of the present invention, users can subscribe to infoservices for the delivery of new published content as it becomes available on the corresponding website without checking the website repeatedly for new content manually. The underlying web feeds which provide the content for the infoservices can be, for example, RSS feeds and Atom feeds.

The figures and the following description relate to preferred embodiments by way of illustration only. Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. It should be noted that from the following discussion, alternate embodiments of the structures and methods disclosed herein will be readily recognized by one skilled in the art as viable alternatives that may be employed without departing from the principles described herein.

Figure 1:
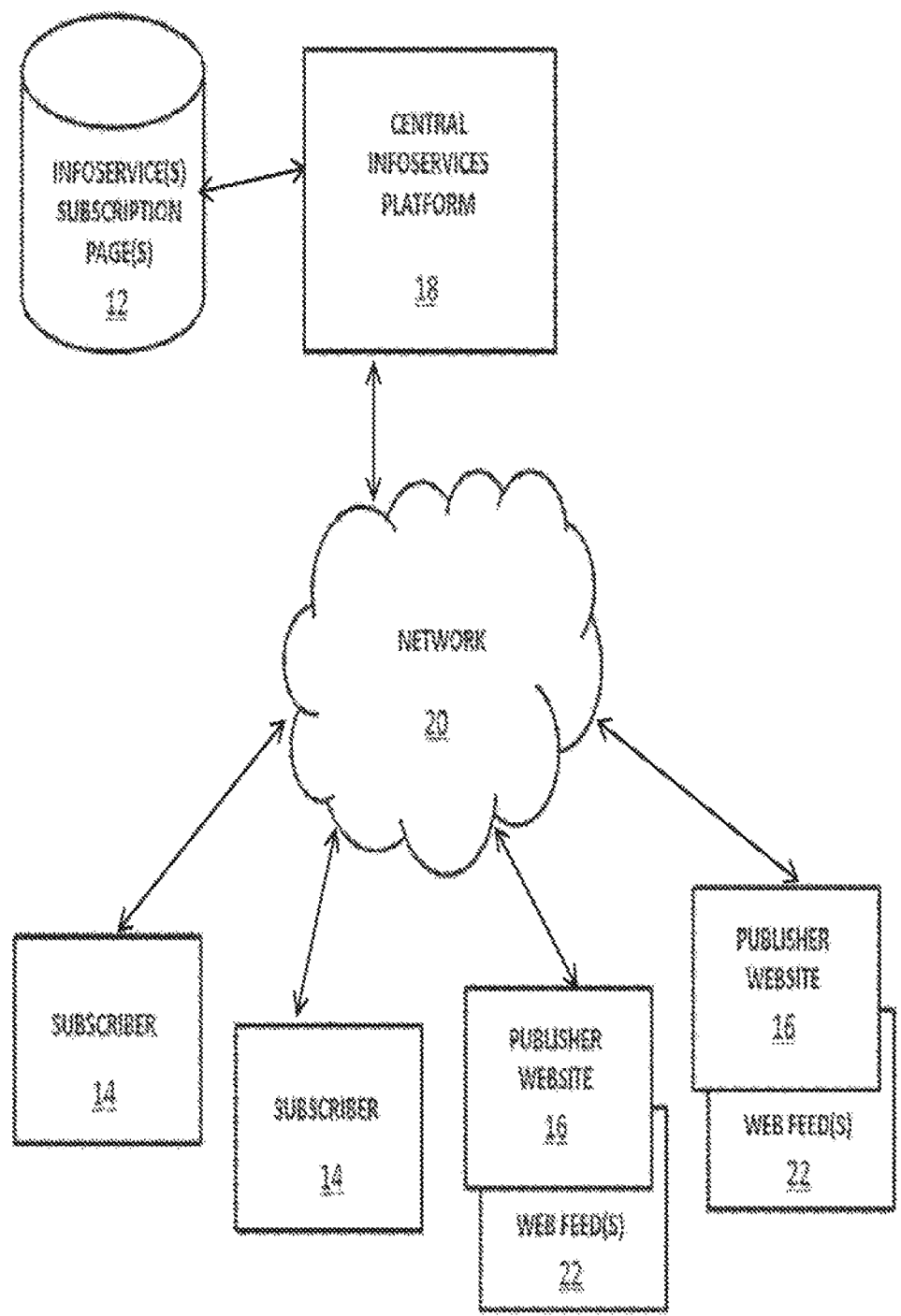
FIG. 1 is a block diagram illustrating one system for use as a central infoservices platform in accordance with a preferred embodiment of the invention.

Referring now to FIG. 1, a central infoservices platform 18 regulates the subscribing process and the sending of information through a network 20 to subscribers 14. Visitors of a publisher website 16 become subscribers 14 by clicking on a link on a publisher website 16 which directs them to an infoservice subscription page 12 where they can subscribe in order to receive new content from the publisher website 16 in the future. The infoservice subscription page 12 can also be accessed directly by entering the url of the infoservice subscription page 12 directly into the browser or from other websites which link to it. During the process of subscribing subscribers 14 can make several selections as in order to define which and how messages will be delivered (as explained further below). The central infoservices platform 18 then takes messages from the publisher website(s) 16 or their corresponding web feeds 22 and delivers it to subscribers 14 according to the subscribers 14 selections. The central infoservices platform 18 may become aware of new content on the publisher website 16 or their corresponding web feed(s) 22 either by repeatedly screening the publisher website 16 or their corresponding web feed(s) 22, or by getting alerted, for example from the publisher of the website 16, that new content is available.

Figure 2:
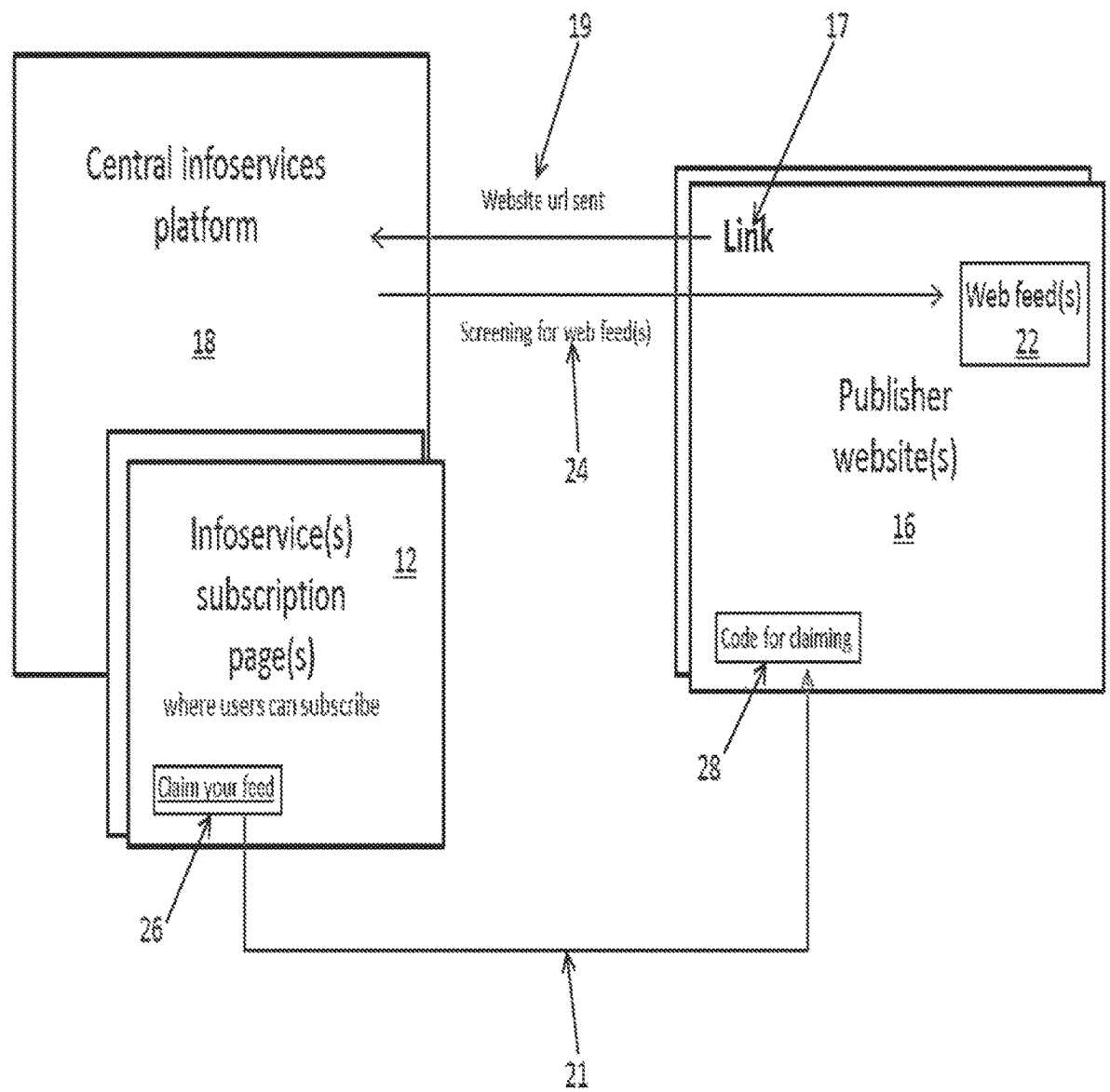
FIG. 2 is a system block diagram illustrating how a publishers website offers an infoservice by just placing a link on the website, and the process whereby the publisher validates ownership of the underlying web feed in accordance with a preferred embodiment of the invention.

Referring now to FIG. 2, there is shown a system block diagram illustrating one process for enabling the publisher of a website 16 to place a link 17 on their website 16 which triggers a process on the central infoservices platform 18 which sets up an infoservice with the corresponding infoservice subscription page 12 on the central infoservices platform 18, so that the publishers of the publisher websites 16 do not need to take any further action in order for allowing their visitors to subscribe and receive messages once new content is published on the publisher websites 16 or their corresponding web feeds 22. Referring once again to FIG. 2, this works as follows: the link 17 which is placed on the publisher website 16 is linking to the central infoservices platform 18. When visitors of the publisher website 16 click on this link 17 they get directed to the central infoservices platform 18 and in addition information will be sent 19 to the central infoservices platform 18, e.g. the url of the publisher website 16 where this link 17 was clicked on. This can be performed by using "http referer" as known in the art which allows the central infoservices platform 18 to identify from which url the user is coming from. Based on this information, the central infoservices platform 18 will identify the web feed(s) 22 location of the publisher website 16. This can be done for example by searching the publisher website 16 for web feeds 22 directly, e.g., in the source code of the publisher website 16, or identifying which developer platform the publisher website 16 is built on (e.g. Wordpress), which follows a known logic where to find the web feed 22 location (e.g. for Wordpress it is www.publisherswebsite-.com/feed). After the web feed 22 has been identified, an infoservice gets set up on the central infoservices platform 18 along with an infoservices subscription page 12, where users can subscribe. Once the setup of the infoservice and the corresponding infoservice subscription pages 12 has been performed, if users click on the provided link 17 on the publisher website 16 again it will direct users directly the infoservice subscription page 12 of the infoservice which has been set up previously, again based on the information from which website 16 the users are coming from which got transferred to the central infoservices platform 18 via http referer.

Referring again to FIG. 2 it should be understood that the link 17 which is put on the publisher website 16 can be generic, i.e. different publisher websites 16 can all use the same link 17 (e.g. www.centralplatform.com/subscribe) which for example the publisher of the website 16 found in an online forum. This enables publishers to quickly provide a subscription option or infoservice for visitors of their websites 16, without having to go to a third-party-service and entering their website 16 information, such as the url of their website 16, in order to set it up. Also, publishers may find this link 17 already placed on their website 16 when they launch the website 16, e.g. because it was already included on the website template they downloaded in order to set up their website 16. Therefore those publishers do not even have to place the link 17 themselves, but they already find it on their website 16, i.e. they already have a working infoservice or subscription option without having taken any action.

Referring again to FIG. 2 it should be understood that the above described process of transferring of the web site url of the publishers websites 16 to the central infoservices platform 18 by a process using http referer is only one means besides others for the central infoservices platform 18 to get knowledge of the website's 16 url or the web feed(s) 22 location. For example, a computer program, such as a plugin installed on the publishers website 16 may send the website url or the location of the corresponding web feeds 22 to the central infoservices platform, or a subscriber 14 may enter the website url of the publisher website 16 directly on the central infoservices platform 18.

Turning once again to FIG. 2, the above described process allows a quick and easy method for publishers to offer an infoservice and an option to subscribe to their website 16. However, with this process publishers do not have any information about their subscribers 14 who subscribed on the infoservices subscription pages 12 on the central infoservices platform 18, such as number of subscribers 14, their contact details, demographic data etc. as this information is collected and managed only by the central infoservices platform 18. Therefore the above described process is supplemented with a process 21 whereby publishers can prove that an infoservice on the central infoservices platform 18 is based on a web feed 22 which belongs to their website 16, which grants the publishers access to that data. This process can work as follows: On the central infoservices platform 18 the publishers can trigger a claiming process, for example by clicking on a link 26 on the subscription page 12. The publisher will then get displayed, or sent by email or other means, an instruction for proving that the publisher is actually the publisher of the website 16 and its corresponding web feed(s) 22. For example, the publisher may be prompted to insert a verification code 28 on the website 16, or upload a file on the publishers server(s), which got generated by the central infoservices platform 18. The central infoservices platform 18 will then screen the publishers website, or servers, to validate that the publisher has performed those actions, which, if successful, proved the publisher's ownership of the website 16 and its corresponding web feed(s) 22. After successful validation, the central infoservices platform 18 will provide the publisher access to the corresponding infoservice data, for example by sending the publisher login details so that the publisher can logon to the central infoservices platform 18 and view the data of the infoservice which belongs to the publishers website 16 or corresponding feed(s) 22.

Figure 3:
FIG. 3 is a captured website screenshot of a website which placed the link to the central infoservices platform and therefore offers the infoservice to its readers.

Referring now to FIG. 3, a captured screenshot of a publisher website 16 is displayed which has placed a link 17 which links to the central infoservices platform 18 so that visitors of the publisher website 16 can subscribe. As displayed in the screenshot, the link 17 which is placed on the publisher website 16 can be a text link, or an icon or image, a code including the link, or any other form of embedded link on the publishers website 16 which links to the central infoservices platform 18.

Figure 4:
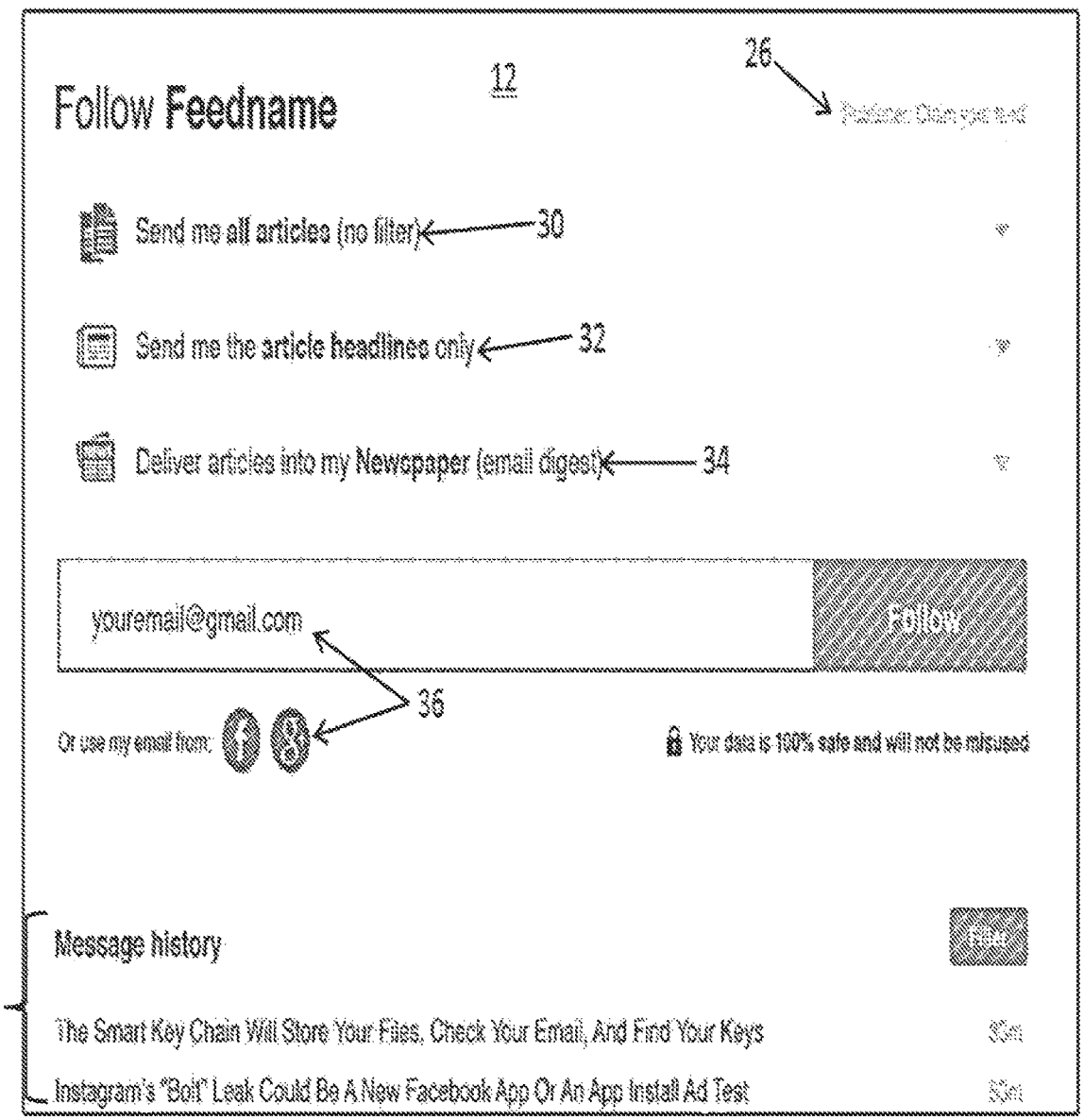
FIG. 4 is a captured screenshot of the infoservice subscription page on the central infoservices platform; on this page subscribers can subscribe to the infoservice, and publishers can trigger the process to validate ownership of the underlying web feed.

Turning to FIG. 4, a captured screenshot of an infoservice subscription page 12 is displayed. Subscribers 14 can subscribe to the infoservice by making selections 30, 32, 34 (as explained below) and provide their contact details 36 so that messages can get delivered. Subscribers 14 can also see the messages which have been sent previously 38 through this infoservice, thereby facilitating the decision of the subscriber 14 to subscribe or not as this provides the subscriber 14 an idea of which type messages to expect in the future. The infoservice subscription page may also include a link 26 which publishers can use to start the claiming process 21.

Figure 5:
FIG. 5 is a captured screenshot of the infoservice subscription page where the subscriber is selecting to only receive messages with certain tags from this infoservice.

On FIG. 5 a captured screenshot of a selected area of the infoservice subscription page 12 is displayed showing a subscriber 14 applying a filter 30 to the infoservice in order to only receive selected messages in the future. This screenshot shows a tag filter where the subscriber 14 chooses to only receive messages which have been tagged with certain topics. The information which messages have which tags is also contained in many web feeds 22 of publishers websites 16 and the central infoservices platform 18 uses this information to enable the tailoring of the subscription as described here. In addition to filtering an infoservice by tags, it may also get filtered by certain keywords or authors of the published content on the publishers website 16.

Figure 6:
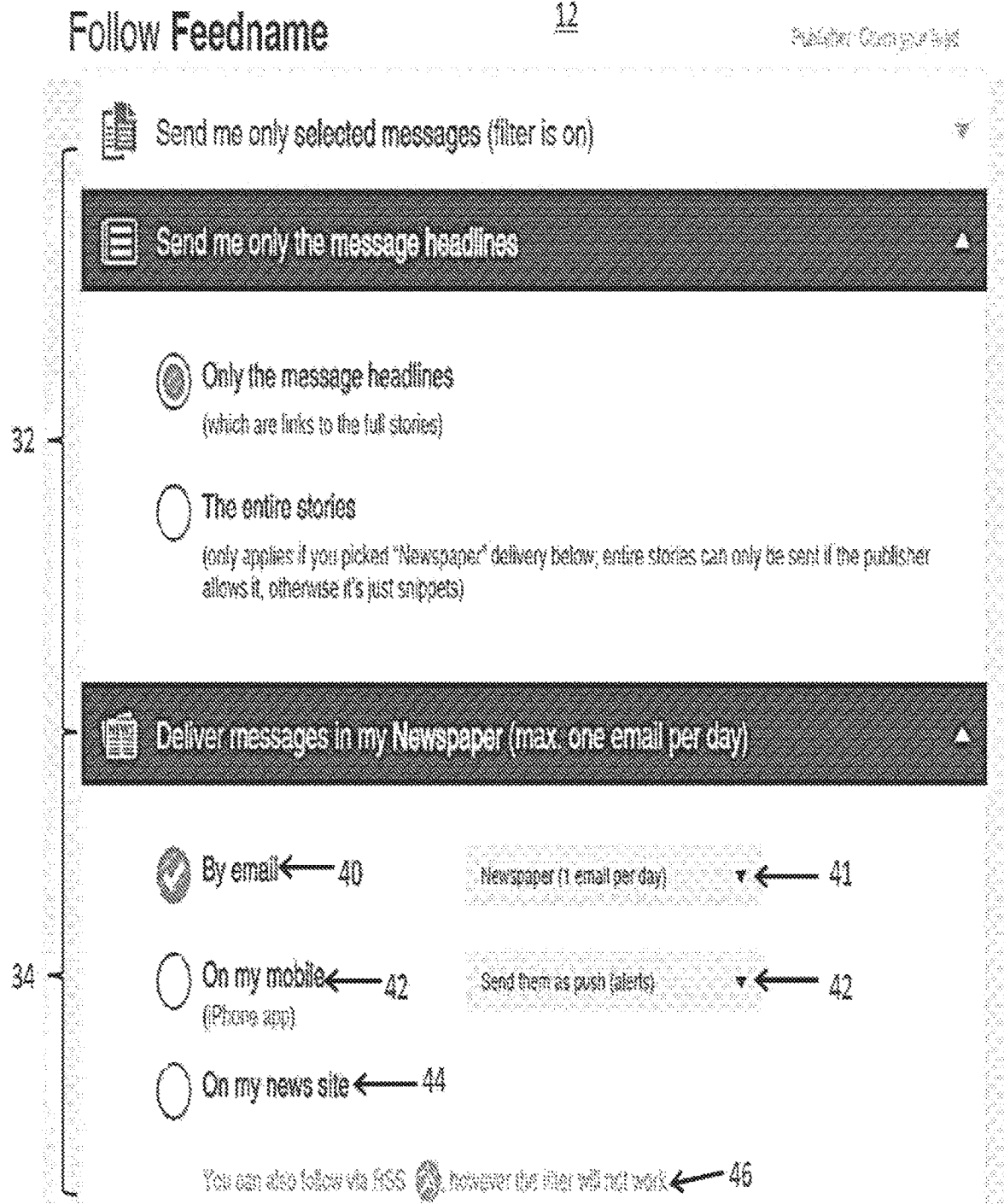
FIG. 6 is a captured screenshot of the infoservice subscription page where the subscriber is selecting to receive the full message content or only the headlines, and also via which delivery channel messages should be sent.

FIG. 6 is captured screenshot of a selected area of the infoservice subscription page 12 which displays further selection options for subscribers 14. Subscribers 14 can select to receive only the headlines of the messages or the entire message content 32 provided the infoservices' underlying web feed(s) 22 provide this information. Subscribers 14 can also choose how messages should get delivered to them, either by email 40, mobile 42, on their news site 44 or via a web feed 46. If subscribers 14 select to receive messages by email 40, they can further specify 41 if they prefer to receive a separate email for every message that get sent from this infoservice, or several messages consolidated in one email which have accumulated over a defined period of time, e.g. one day. If subscribers 14 select to receive messages from the infoservice on their mobile devices 42 they can further specify if those messages should trigger an alert on their mobile devices or appear silently on the mobile devices.

Figure 7:
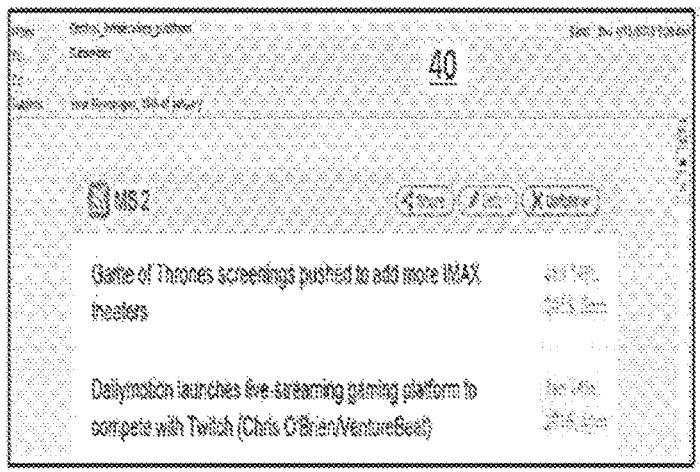
FIG. 7 shows captured screenshots of messages which got delivered to subscribers via channels email, mobile and news page.
Figure 7:
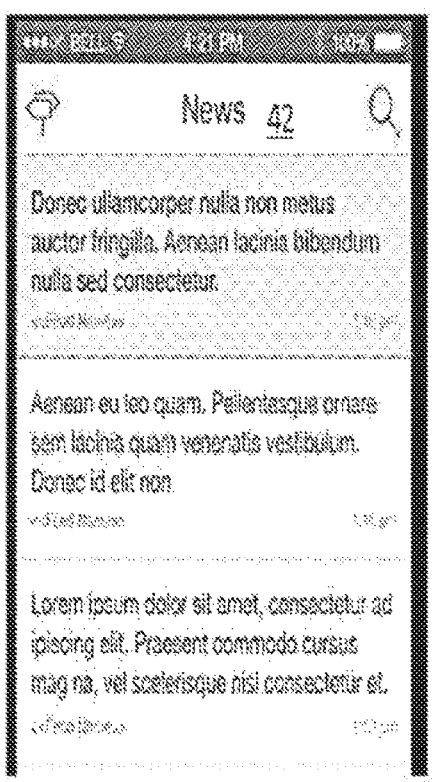
Figure 7:

FIG. 7 shows captured screenshots of sample messages which got sent to subscribers 14 via the central infoservices platform 18 via different delivery channels, such as email 40, mobile 42 and news page 44. The news page 44 is a web page which has been set up for users who registered at the central infoservices platform 18 which displays all messages from infoservices which the subscriber 14 is subscribed to and has selected news page 44 as delivery channel.

Figure 8:
FIG. 8 shows a captured screenshot of a pop-up which appears after a publisher clicked on "Publisher: Claim your feed" on the infoservice subscription page which starts the claiming process so that the publisher can validate ownership of the infoservice's underlying web feed.

FIG. 8 turns back to the publisher perspective and displays a captured screenshot of a pop-up which gets displayed after a publisher has clicked on the link 26 on the infoservice subscription page 12 which triggers the claiming process 21. On this screenshot the publisher is asked to provide his contact information 50 in order to send the instructions by email on how to validate ownership of the websites 16 or corresponding web feed(s) 22, however this can also be performed by other means, such as displaying the instructions to the publisher on a webpage.

Figure 9:
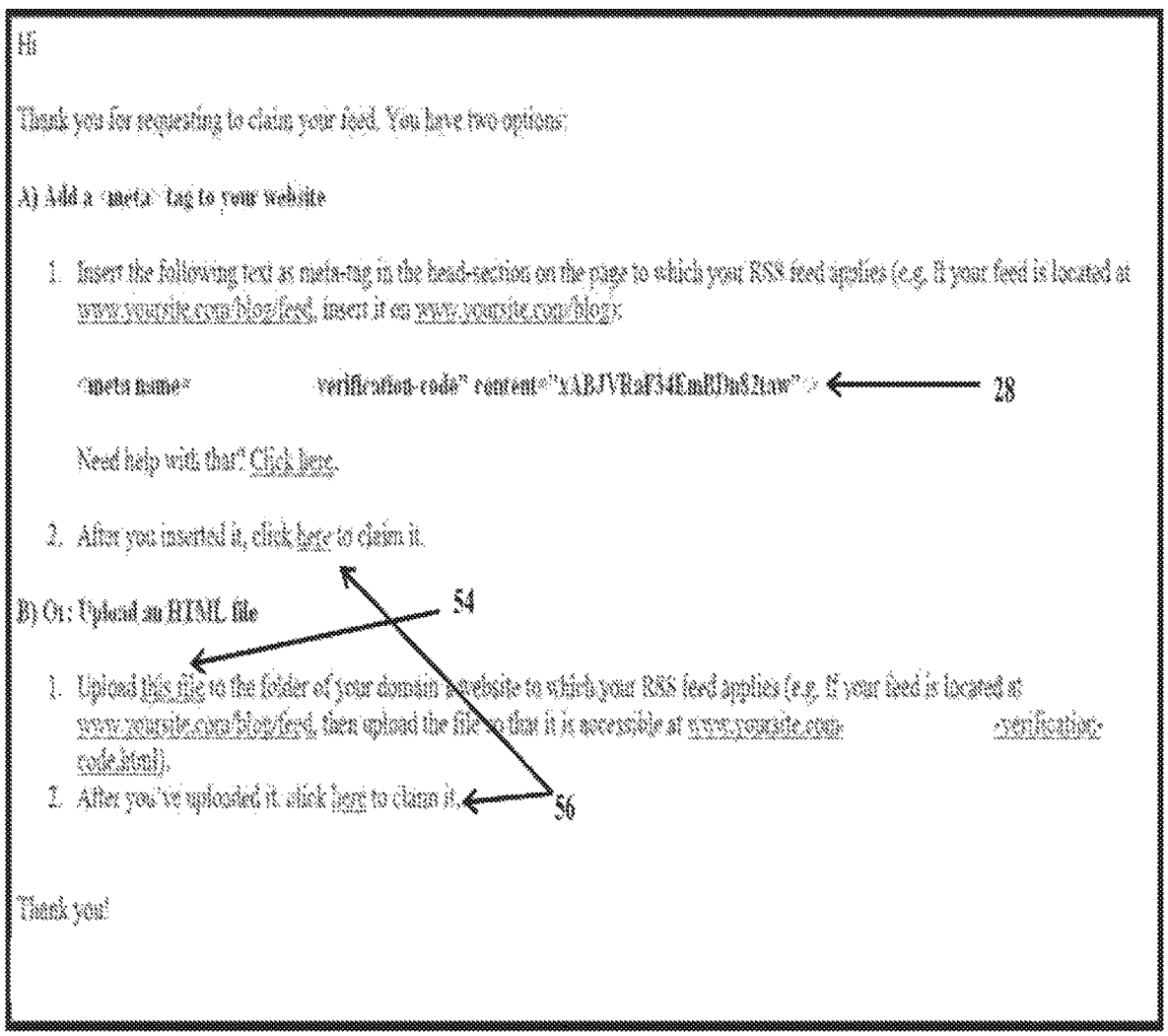
FIG. 9 shows a captured screenshot of the email a publisher received containing instructions how to validate ownership of the infoservice's underlying web feed.

FIG. 9 is a captured screenshot of instructions for the publisher how to validate ownership of the website 16 or corresponding web feed(s) 22. It contains a verification code 28 as well as a link to a file 54 which the publisher can include or upload on the website 16 or servers. It also contains a link 56 the publisher can click on after the publisher performed the actions as described above, so that the central infoservices platform 18 can validate that the actions have been performed.

Figure 10:
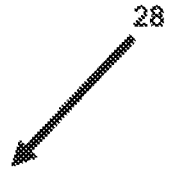
FIG. 10 shows a captured screenshot of the website's code where the publisher enters the verification code to validate that the publisher is owner of the infoservice's underlying web feed.

FIG. 10 is a captured screenshot of the code of a publisher's website 16 where the publisher has inserted a verification code 28 in order to prove access and therefore ownership of that website 16 and its corresponding web feed(s) 22.

Figure 11:
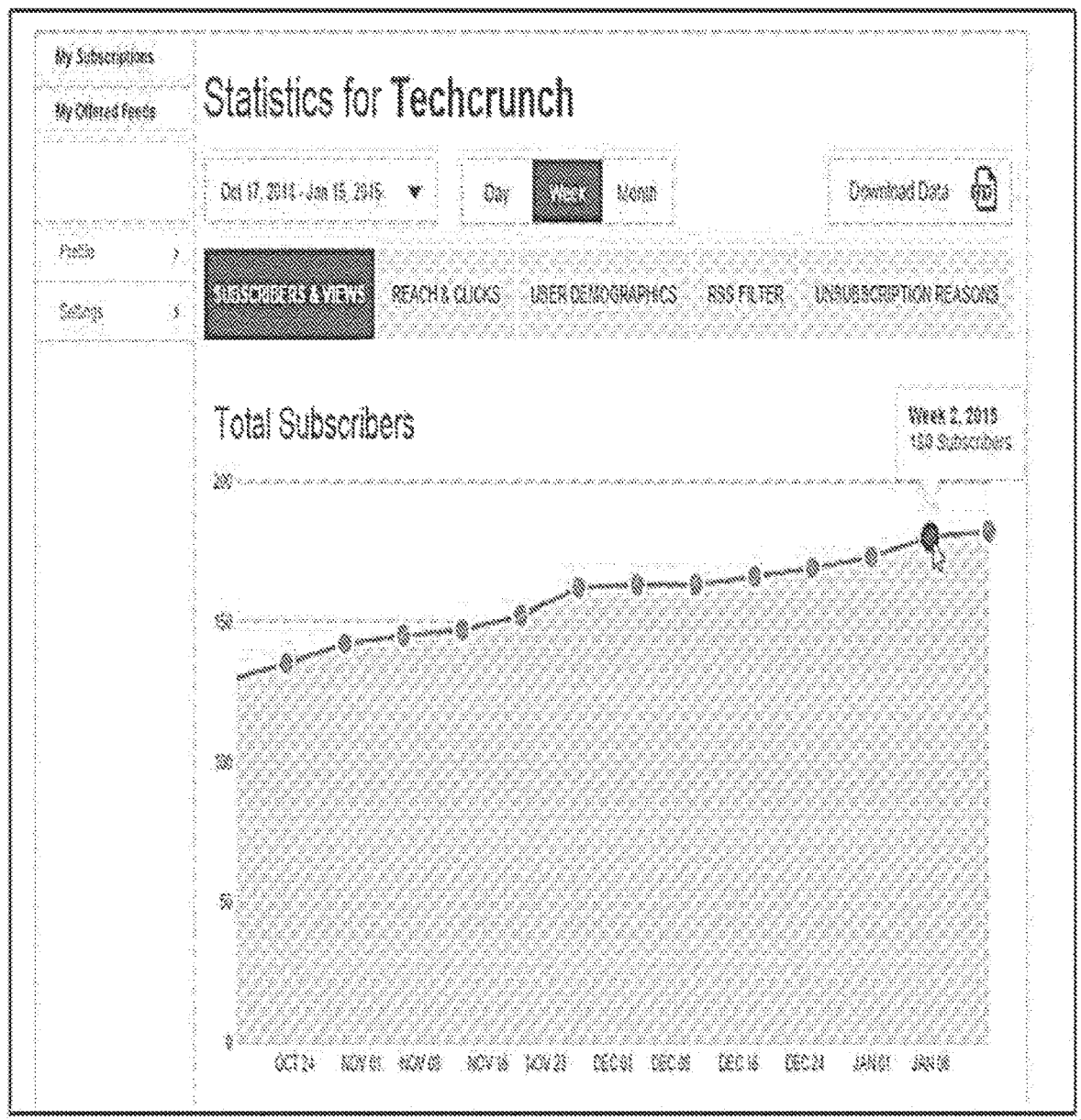
FIG. 11 shows a captured screenshot of statistics about a publisher's infoservice which can be accessed after successful validating ownership of the infoservice's underlying web feed.

FIG. 11 is a captured screenshot displaying information about an infoservice to the publisher, to which the publisher got access to on the central infoservices platform 18 after the publisher has successfully completed the claiming process 21.

It is contemplated for embodiments of the invention to extend to individual elements and concepts described herein, independently of other concepts, ideas or system, as well as for embodiments to include combinations of elements recited anywhere in this application. Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), and flash drives, among others.

Although the present invention has been described with reference to specific exemplary embodiments, it will be evident that the various modification and changes can be made to these embodiments without departing from the broader spirit of the invention.

What is claimed is:

1. A method comprising:
   sending a url corresponding to a website to a central infoservices platform;
   identifying corresponding one or more web feeds of said website by said central infoservices platform based on said website's corresponding url;
   setting up an infoservice based on said identified one or more web feeds by said central infoservices platform;
   subscribing to said infoservice on said central infoservices platform by subscribers;
   retrieving new content from said one or more web feeds by said central infoservices platform; and
   delivering said new content by said central infoservices platform to the subscribers,
   wherein said sending of said corresponding url to said central infoservices platform is performed using a http referer.

2. The method according to claim 1, further comprising a process for validating ownership of said one or more web feeds to said central infoservices platform.

3. The method according to claim 1, further comprising a process for validating ownership of said one or more web feeds to said central infoservices platform; collecting information about the subscribers of said infoservice by said central infoservices platform; and said central infoservices platform providing access to said subscriber information based on a successful validation of ownership of said one or more web feeds.

4. The method according to claim 1, further comprising a process for validating ownership of said one or more web feeds to said central infoservices platform; collecting information about the subscribers of said infoservice by said central infoservices platform; and said central infoservices platform providing said publisher access to said subscriber information based on a successful validation of ownership of said one or more web feeds wherein said subscriber information includes the email addresses of the subscribers.

5. The method according to claim 1, further comprising providing the subscribers an option to choose from at least two subscription channels.

6. The method according to claim 1, further comprising providing the subscribers an option to choose from subscription channels including email, mobile, and news page.

7. The method according to claim 1, further comprising providing the subscribers an option to filter said infoservice to only receive messages from said infoservice that are linked with certain tags or contain certain keywords.

8. A computer program product comprising a non-transitory computer readable storage medium having program instructions stored on the non-transitory computer readable storage medium, the program instructions executable to:
   send a url corresponding to a website to a central infoservices platform;
   identify corresponding one or more web feeds of said website by said central infoservices platform based on said website's corresponding url;
   set up an infoservice based on said identified one or more web feeds by said central infoservices platform;
   subscribe to said infoservice on said central infoservices platform by subscribers;
   retrieve new content from said one or more web feeds by said central infoservices platform; and
   deliver said new content by said central infoservices platform to the subscribers,
   wherein said sending of said corresponding url to said central infoservices platform is performed using a http referer.

9. The computer program product according to claim 8, further comprising a process for validating ownership of said one or more web feeds to said central infoservices platform.

10. The computer program product according to claim 8, further comprising a process for validating ownership of said one or more web feeds to said central infoservices platform; collecting information about the subscribers of said infoservice by said central infoservices platform; and said central infoservices platform providing access to said subscriber information based on a successful validation of ownership of said one or more web feeds.

11. The computer program product according to claim 8, further comprising a process for validating ownership of said one or more web feeds to said central infoservices platform; collecting information about the subscribers of said infoservice by said central infoservices platform; and said central infoservices platform providing said publisher access to said subscriber information based on a successful validation of ownership of said one or more web feeds wherein said subscriber information includes the email addresses of the subscribers.

12. The computer program product according to claim 8, further comprising providing the subscribers an option to choose from at least two subscription channels.

13. The computer program product according to claim 8, further comprising providing the subscribers an option to choose from subscription channels including email, mobile, and news page.

14. The computer program product according to claim 8, further comprising providing the subscribers an option to filter said infoservice to only receive messages from said infoservice that are linked with certain tags or contain certain keywords.

15. A system comprising:
a processor, a computer readable memory, a computer readable storage medium, and program instructions stored on the computer readable storage medium, the program instructions executable to:
send a url corresponding to a website to a central infoservices platform;
identify corresponding one or more web feeds of said website by said central infoservices platform based on said website's corresponding url;
set up an infoservice based on said identified one or more web feeds by said central infoservices platform;
subscribe to said infoservice on said central infoservices platform by subscribers;
retrieve new content from said one or more web feeds by said central infoservices platform; and
deliver said new content by said central infoservices platform to the subscribers,
wherein said sending of said corresponding url to said central infoservices platform is performed using a http referer.

16. The system according to claim 15, further comprising a process for validating ownership of said one or more web feeds to said central infoservices platform.

17. The system according to claim 15, further comprising a process for validating ownership of said one or more web feeds to said central infoservices platform; collecting information about the subscribers of said infoservice by said central infoservices platform; and said central infoservices platform providing access to said subscriber information based on a successful validation of ownership of said one or more web feeds.

* * * * *